(12) United States Patent
Sekine

(10) Patent No.: US 8,274,866 B2
(45) Date of Patent: Sep. 25, 2012

(54) OPTICAL RECORDING HEAD AND OPTICAL RECORDING APPARATUS

(75) Inventor: Koujirou Sekine, Ibaraki (JP)

(73) Assignee: Konica Minolta Opto, Inc., Hachioji-shi, Tokyo (JP)

( * ) Notice: Subject to any disclaimer, the term of this patent is extended or adjusted under 35 U.S.C. 154(b) by 289 days.

(21) Appl. No.: 12/716,553

(22) Filed: Mar. 3, 2010

(65) Prior Publication Data
US 2010/0232281 A1    Sep. 16, 2010

(30) Foreign Application Priority Data
Mar. 11, 2009    (JP) .................................. 2009-057869

(51) Int. Cl.
*G11B 11/00* (2006.01)
(52) U.S. Cl. .................................. 369/13.33; 369/112.27
(58) Field of Classification Search ............... 369/13.33, 369/13.32, 13.24, 13.14, 13.03, 13.02, 112.27, 369/112.09; 360/59, 313, 125.31, 125.74; 385/10
See application file for complete search history.

(56) References Cited

U.S. PATENT DOCUMENTS
| | | | | |
|---|---|---|---|---|
| 6,944,112 B2 * | 9/2005 | Challener | ................ | 369/112.27 |
| 2011/0075526 A1 * | 3/2011 | Sekine et al. | ............... | 369/13.24 |
| 2011/0134740 A1 * | 6/2011 | Sekine et al. | ................ | 369/100 |

* cited by examiner

*Primary Examiner* — Ali Neyzari
(74) *Attorney, Agent, or Firm* — Cozen O'Connor

(57) ABSTRACT

An optical recording head includes: a light source; a slider comprising a wave guide which irradiates light from the light source to a recording medium, wherein a grating coupler is formed on an end portion at an opposite side of the waveguide relative to the light source; and an optical element which comprises a diffraction grating and introduces the light from the light source to the grating coupler through the diffraction grating. The optical element deflects the light from the light source so that the light is incident into the grating coupler with a deflection angle larger than 90 degrees with respect to a direction in which the light proceeds when the light is incident into the optical element.

18 Claims, 9 Drawing Sheets

OPTICAL RECORDING HEAD AND OPTICAL RECORDING APPARATUS

CROSS REFERENCE TO RELATED APPLICATION

The present application claims priority on Japanese Patent Application No. 2009-057869 filed in the Japanese Patent Office on Mar. 11, 2009, the entire content of which is hereby incorporated by reference.

BACKGROUND OF THE INVENTION

1. Field of Technology

This invention relates to an optical recording head and an optical recording apparatus.

2. Description of Related Art

In recent years, higher density of an information recording medium is required and recording methods of various types have been proposed. A thermally assisted magnetic recording method is also one of them. Since it is necessary to make the size of each magnetic domain smaller to achieve higher density, a material having a large coercive force is utilized to store data stably. In such a recording medium generation of strong magnetic field is necessary at the time of writing, and there are limitations to a small head corresponding to a domain having been made smaller.

Therefore, proposed has been a method to assure the stability of recorded magnetic bits by causing magnetic softening by local heating at the time of recording and recording is performed in a state of decreased coercive force followed by stop of heating to allow natural cooling. This method is called as a thermally assisted magnetic recording method.

In thermally assisted recording method, it is desirable to perform instantaneous heating of a recording medium. Further, contact between a mechanism of heating and a recording medium is not allowed. Therefore, heating is generally performed utilizing absorption of light, and a method to utilize light for heating is called an optically assisted method. In the case of performing high density recording by an optically assisted method, required is an optical spot as minute as not more than the wavelength of utilizing light.

Therefore, employed is an optical head which employs near-field light (also referred to as light of near field vision) emitted through an optical opening having a size of not larger than the wavelength of incident light. The followings have been proposed as an optical recording head having an optical spot as minute as described above (Refer to U.S. Pat. No. 6,944,112)

An optical recording head is equipped with a writing magnetic pole, and a wave guide provided with a core layer and a clad layer which are adjacent to said writing magnetic pole. A core layer is provided with a diffraction grating to introduce light into said core layer, and such as parallel laser light is efficiently coupled with the core layer when laser light is irradiated against this diffraction grating at a predetermined incident angle. Light coupled with a core layer is converged to a focal point located in the neighborhood of the top portion of a core layer and a recording medium is irradiated and heated by light radiated from the top portion, whereby writing is conducted by a writing magnetic pole.

The above-described element in which laser light is incident at a predetermined angle, being coupled with a wave guide and converged to be emitted from the top portion, is called as a wave guide type solid immersion mirror (PSIM: Planar Solid Immersion Mirror).

In PSIM utilized in an optical recording head, which is disclosed in U.S. Pat. No. 6,944,112, it is necessary to make laser light incident at a predetermined angle; however, a specific method to introduce light into PSIM (hereinafter, referred to as a wave guide) has not been disclosed.

To make light incident into a wave guide at a predetermined angle, a light source is necessary to be arranged obliquely above the wave guide; however, the thickness of an optical recording system becomes large when a light source is arranged in such a position.

Further, there is a case to utilize semiconductor laser light as light introduced into a wave guide. In a semiconductor laser such as a Fabry-Perot resonance type, a so-called mode hop phenomenon will be generated to vary the oscillation wavelength when there is a temperature variation. Since the diffraction angle is varied when a wavelength of light incident into the diffraction grating of a wave guide varies, efficiency of optical coupling with a wave guide will be decreased. To prevent decrease of the optical coupling efficiency, it is necessary to vary the incident angle into a diffraction grating of a wave guide depending on wavelength variation.

This invention has been made in view of the above-described problems and the object is to provide an optical recording head and an optical recording system which are provided with an optical element which has a simple constitution and can efficiently introduce light into a wave guide.

SUMMARY OF THE INVENTION

To achieve the above mentioned problem, one aspect of the present invention is to provide An optical recording head comprising: a light source; a slider comprising a wave guide which irradiates light from the light source to a recording medium, wherein a grating coupler is formed on an end portion at an opposite side of the waveguide relative to the light source; and an optical element which comprises a diffraction grating and introduces the light from the light source to the grating coupler through the diffraction grating, wherein the optical element deflects the light from the light source so that the light is incident into the grating coupler with a deflection angle larger than 90 degrees with respect to a direction in which the light proceeds when the light is incident into the optical element.

Another aspect of the present invention is to provide an optical recording apparatus comprising said optical element and the recording medium.

DETAILED DESCRIPTION OF THE INVENTION

Figure 1:
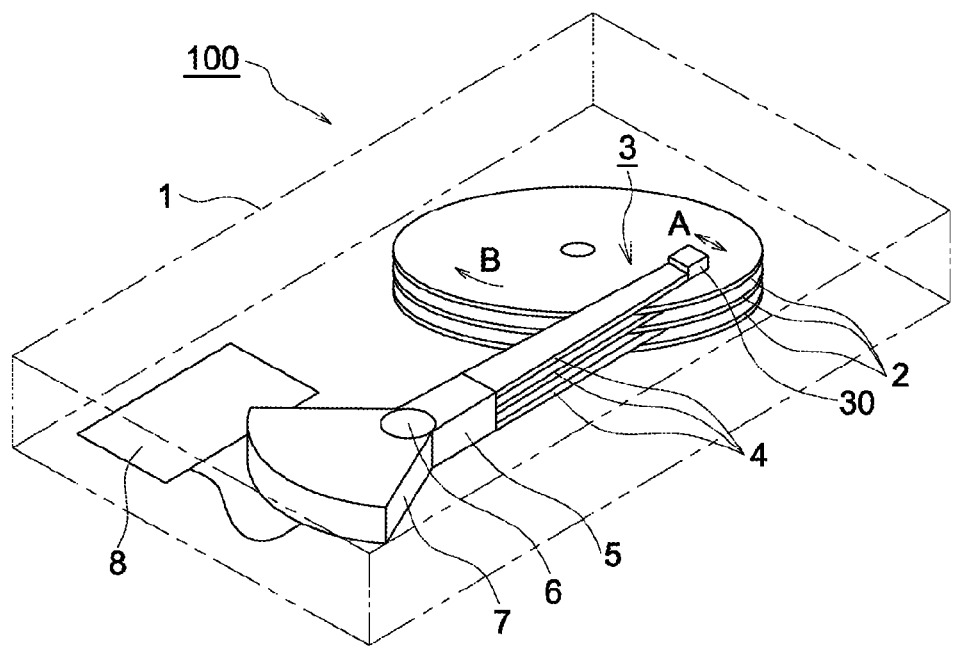
FIG. 1 is a drawing to show an example of an outline constitution of an optical recording system on which an optically assisted magnetic recording head (an optical recording head) is mounted.

In the following, this invention will be explained based on an optically assisted magnetic recording head provided with a magnetic recording part on an optical recording head, and an optical recording system equipped with an optically assisted magnetic recording head, which are embodiments shown in the drawings; however, this invention is not limited to said embodiments. Herein, repeated explanations will be appropriately omitted as for the same parts and corresponding parts between embodiments each other by adding the same symbols.

In FIG. 1, shown is an example of an outline constitution of an optical recording system (such as a hard disc system) on which an optically assisted magnetic recording head is mounted. This optical recording system 100 is equipped with the following (1)-(6) in the box 1.
(1) A disc for recording (recording medium) 2
(2) Suspension 4 supported by an arm 5 which is arranged to be rotatable toward arrow A direction (the tracking direction) around support axis 6 as a fulcrum
(3) Actuator 7 for tracking which is attached on arm 5 to rotationally drives arm 5
(4) An optically assisted magnetic recording head (hereinafter, referred to as optical recording head 3) including suspension 4 and slider 30 attached on the top portion thereof via connecting member 4a
(5) A motor (not shown in the drawing) to rotate disc 2 toward arrow B direction
(6) Actuator 7 for tracking, a motor and control part 8 which controls optical recording on disc 2 utilizing optical recording head 3 including control of such as irradiation of light or generation of magnetic field corresponding to writing information Such optical recording system 100 is constituted so that slider 30 is relatively shiftable while being floated on disc 2.

Figure 2:
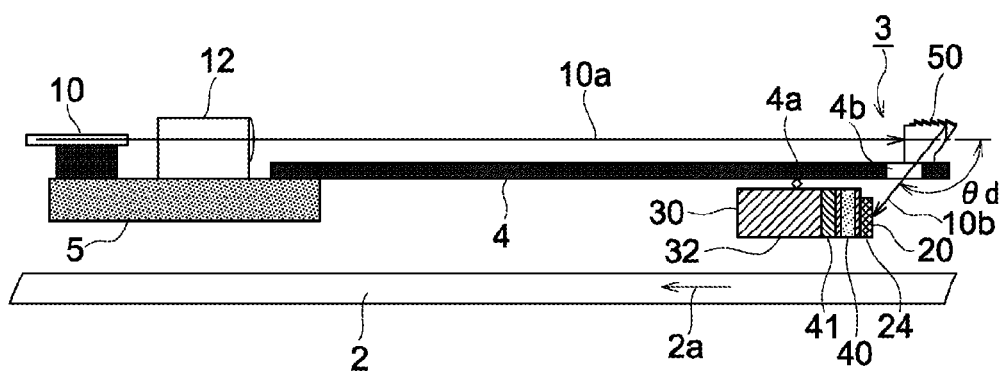
FIG. 2 is a drawing to show the cross section of an optical recording head and a neighboring portion thereof.

FIG. 2 conceptually shows optical recording head 3 and a neighboring portion thereof, as an example of optical recording head 3 based on a cross-sectional view. Optical recording head 3 is an optical recording head utilizing light for information recording on disc 2 and equipped with such as slider 30, wave guide 20, optical element 50, magnetic recording part 40 and magnetic information reproducing part 41. Wave guide 20 is also referred to as a wave guide type solid immersion mirror (PSIM: Planer Solid Immersion Mirror) and is provided with a diffraction grating, which will be explained later.

Slider 30 is shifted relatively against disc 2 as a magnetic recording medium while being floated; however, contact may happen in the case that dust attached on disc 2 or a defect on a medium is present. To reduce friction generated in such a case, it is desirable to utilize a hard material having high abrasion resistance as a material of slider 30. Such as a ceramic material containing $Al_2O_3$, AlTiC or zirconia and TiN may be utilized. Further, as an abrasion resistant treatment, on the disc 2 side surface of slider 30 may be subjected to a surface treatment such as a DLC (diamond like carbon) cover layer.

Further, on the surface of slider 30 opposing to disc 2 is provided with an air bearing surface (also referred to as an ABS surface) to improve the floating property.

Floating of slider 30 is required to be stabilized in a state of close to disc 2 and it is necessary to appropriately apply slider 30 with pressure to restrain the floating force. Therefore, suspension 4 which is fixed on slider 30 has a function to appropriately apply pressure to restrain the floating force of slider 30 in addition to a function to perform tracking of slider 30.

Light source 10 is such as a semiconductor laser or an emission top portion of an optical fiber and is fixed on arm 5 together with such as lens 12 comprising plural sheets of lenses which makes light emitted from light source 10 into parallel light. However it is not limited that light source 10 is fixed on arm 5. Light 10a emitted through lens 12 as parallel light reaches slider 30 after having been deflected by optical element 50.

In slider 30, wave guide 20 is arranged approximately vertical to the recording surface of disc 2 and on the side surface opposite to light 10. Light 10a emitted from light source 10 passes the above portion opposite to disc 2 of suspension 4 and is incident into optical element 50. Light incident into optical element 50 is deflected at a predetermined angle which enable efficient incidence of light into wave guide 20.

The angle of light deflected by optical element 50 is deflection angle $\theta d$, which is shown in FIG. 2. Deflection angle $\theta d$ is an angle between the proceeding direction of light 10a incident into optical element 50 and the emission direction (also the direction toward which light proceeds so as to incident into diffraction grating 20a of wave guide 20 which will be described below) of light 10a from optical element 50 after having been deflected by optical element 50. Herein, when optical element 50 is a prism, deflection angle $\theta d$ includes a deflection angle generated due to the refractive index difference with air at the interface; however, the explanation of deflection due to the above-described refractive index difference will be appropriately omitted in the following explanation.

Deflected light, as light 10b emitted from optical element 50, passes through opening 4b arranged on suspension 4 and is incident into wave guide 20 to be introduced into wave guide 20. Light introduced into wave guide 20 proceeds to bottom surface 24 of wave guide 20 and is radiated toward disc 2 as illuminant light to heat disc 2. Herein, in FIG. 2, plasmon antenna 24d which is arranged at the position emitting light or the circumference on bottom surface 24 is omitted.

When radiation light as a minute light spot is irradiated on disc 2 from bottom surface 24, the temperature of the portion irradiated is instantaneously raised to decrease the coercive force of disc 2. Against the portion in a state of decreased coercive force by light irradiation, magnetic information is written by magnetic recording part 40. Further, magnetic information reproducing part 41 to read out recorded magnetic information may be arranged on the retiring side of magnetic recording part 40 or on the approaching side of wave guide 20.

Slider 30 is equipped with magnetic recording part 40 as shown in FIG. 2. Magnetic recording part 40 is preferably arranged adjacently to wave guide 20 to efficiently perform magnetic recoding on the recording plane of disc 2 which has been heated by light, and further is preferably arranged in the down stream of wave guide 20 from the shifting direction of a recording plane (the arrow 2a direction) due to rotation of disc 2. Further, as for light source 10, the emitting side edge plane of a light source itself such as a semiconductor laser tip or a linear light guide such as an optical fiber is preferably arranged and fixed on arm 5 which rotationally shifts slider 30, to easily and stably introduce light 10a emitted from light source 10 into wave guide 20 of slider 30.

According to the relationship of the above-described arrangement of slider 30 and light source 10, and the rotational direction of disc 2; in the case of the proceeding direction of light 10a from light source 10 and the shifting direction of the recording surface of disc 2 is contrary as shown in FIG. 2, it is necessary that light 10a from light source 10 is deflected by over 90 degree to be introduced into wave guide 20.

Figure 3:
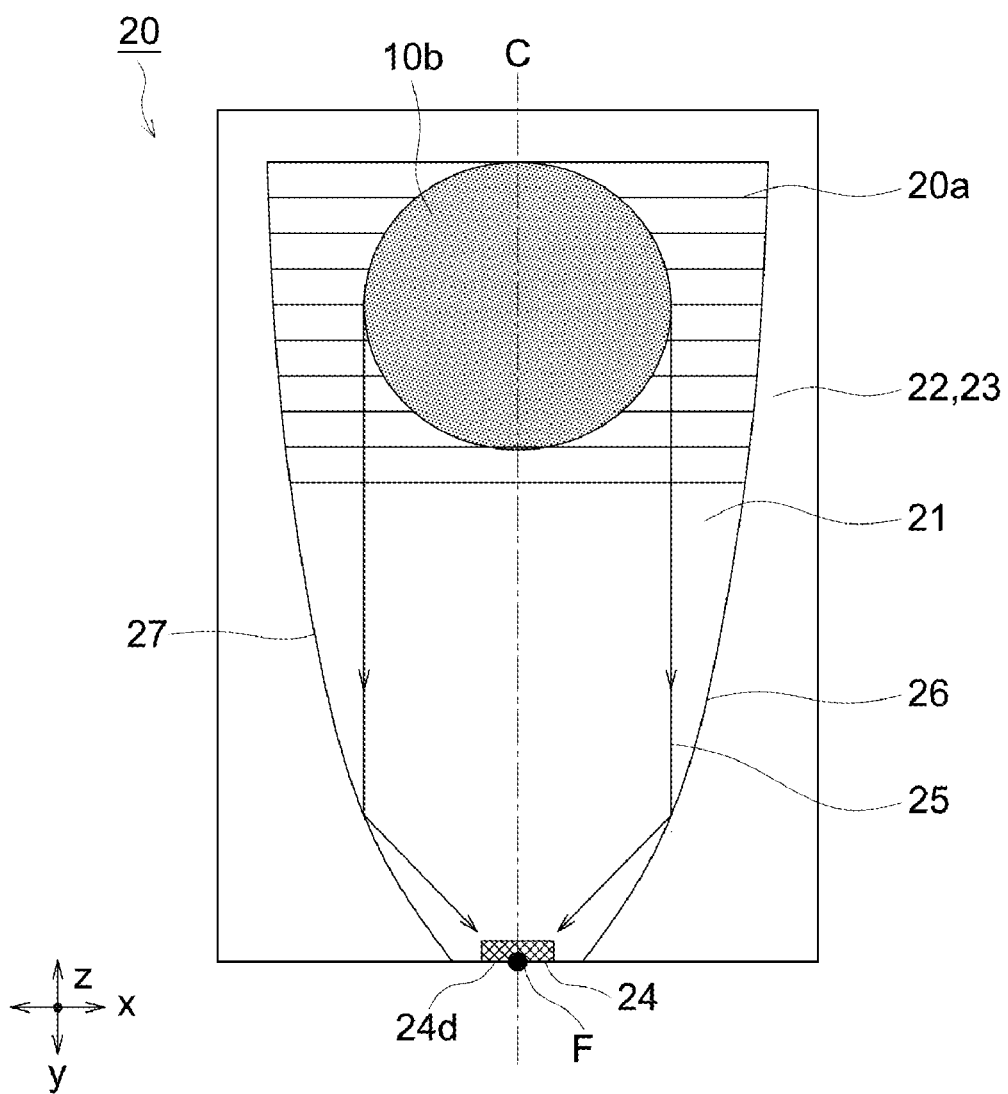
FIG. 3 is a drawing to show the front view of a wave guide.
Figure 4:
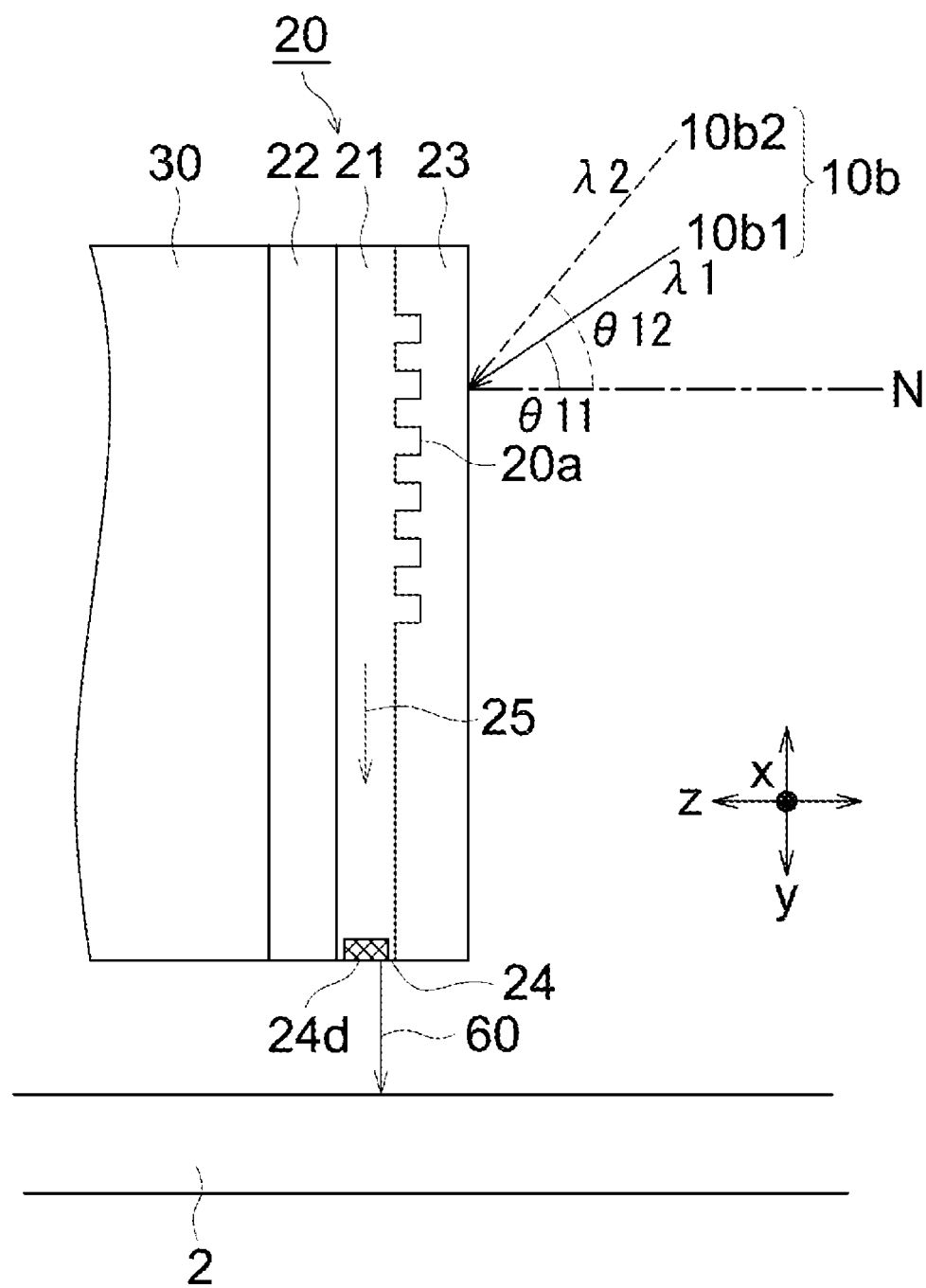
FIG. 4 is a drawing to show the cross section of a wave guide at axis C in FIG. 3.

Wave guide 20 will now be explained. The front view (the perspective view) of wave guide 20 is schematically shown in FIG. 3 and the cross-sectional view at axis C of FIG. 3 is shown in FIG. 4, respectively. The magnetic recording part and the magnetic reproduction part are abbreviated in FIG. 4. Wave guide 20 is provided with core layer 21, under clad layer 22 and upper clad layer 23 which constitute the wave guide, and on said core layer 21, formed is diffraction grating 20a (also referred to as a grating coupler) which couples light 10b emitted from optical element 50 with core layer 21. In FIG. 3, light 10b is shown as a light spot to irradiate diffraction grating 20a.

Wave guide 20 can be constituted of plural layers comprising substances having different refractive indexes, and the refractive index of core layer 21 is not smaller than those of under clad layer 22 and upper clad layer 23. Wave guide 20 is constituted based on this refractive index difference, and light in core layer 21 is shielded within core layer 21 and efficiently proceeds toward arrow direction 25 to reach bottom surface 24.

It is desirable to set the refractive index of core layer 21 to approximately 1.45-4.0, and the refractive index of under clad layer 22 to approximately 1.0-2.0; however, they are not limited within this range.

It is desirable that core layer 21 is comprised of such as $Ta_2O_5$, $TiO_2$ and ZnSe, and that the thickness is set in a range of approximately 20-500 nm; however, they are not limited within this range. Further, it is desirable that under clad layer 22 and upper clad layer 23 are comprised of such as $SiO_2$, air and $Al_2O_3$, and that the thickness is set in a range of approximately 200-2,000 nm; however, they are not limited within this range.

Core layer 21 is equipped with side surfaces 26 and 27 which are formed so as to practically constitute a parabolic outline to reflect light toward focal point F, to condense light coupled by diffraction grating 20a on focal point F. In FIG. 3, the central axis in lateral symmetry of the parabola outline is shown as axis C (a line perpendicular to the directrix (not shown in the drawing) and passing through focal point F) and the focal point of a parabola as focal point F. On side surfaces 26 and 27, a reflective substance such as gold, silver and aluminum may be provided to assist reduction of the optical reflection loss. Side surfaces 26 and 27, since the thickness is very thin compared to the size of core layer 21 and of others, practically define the outline of core layer 21.

Further, bottom surface 24 of core layer 21 of wave guide 20 has a plane form in which the top of parabola is cut approximately along the direction perpendicular to axis C. Since light radiated from focal point F is rapidly diffused, it is preferable to provide bottom surface 24 with a plane form because focal point F can be arranged nearer to disc 2 to make condensed light incident on disc 2 before dispersion. Focal point F may be formed either on bottom surface 24 or outside bottom surface 24. Herein, bottom surface 24 is a plane in this example, however, is not necessarily a plane.

Plasmon antenna 24d for generation of near-field light may be arranged at focal point F or circumference thereof. A specific example of plasmon antenna 24d is shown in FIG. 16.

Figure 16A:
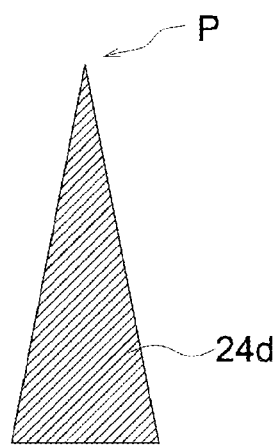
FIGS. 16a, 16b and 16c are drawings to show example of a plasmon antenna.
Figure 16B:
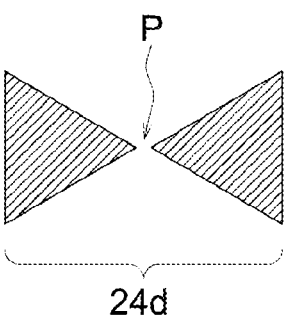
Figure 16C:
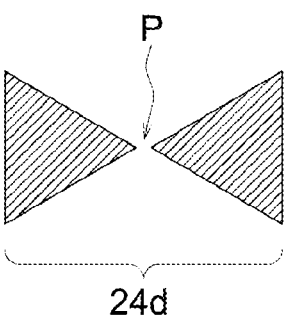

In FIG. 16a is plasmon antenna 24d comprising metallic thin film of a triangle flat plate form, FIG. 16b is plasmon antenna 24d comprising metallic thin film of a rod necktie form, and either of them is comprised of an antenna provided with summit P having a radius of curvature of not more than 20 nm. Further, FIG. 16c is plasmon antenna 24d comprising metallic thin film of a flat plate form having an opening and is an antenna having summit P provided with a radius of curvature of not more than 20 nm. The material of metallic thin film of any one of plasmon antennas 24d includes such as aluminum, gold and silver.

When light acts on these plasmon antennas 24d, near-field light is generated in the vicinity of summit P thereof to enable recording or reproduction utilizing light having a very small spot size. That is, when local plasmon is generated by arranging plasmon antenna 24d on focal point F of core layer 21 or the neighborhood, the size of an optical spot formed on the focal point can be made smaller resulting in advantageous for high density recording. Herein, the summit P of plasmon antenna 24d is preferably located on focal point F.

With respect to light 10b being incident from diffraction grating 20a and introduced into wave guide 20, the suitable incident angle toward diffraction grating 20a, which shows the most efficient coupling efficiency (introduction efficiency) is determined based on the effective refractive index of a wave guide mode in core layer 21 and the cycle of diffraction grating 20a. The suitable incident angle also depends on the wavelength of incident light and is shown in FIG. 4, as incident angle θ11 of light 10b1 having wavelength λ1, and θ12 of light 10b2 having wavelength λ2. In FIG. 4, normal N in the optical incident surface of diffraction 20a equipped on wave guide 20 is shown, and normal N is similarly shown in the drawings to follow. Herein, when $$\lambda1 > \lambda2 \quad (1),$$

$$\theta11 < \theta12 \quad (2).$$

This is because the larger is a wavelength the larger is a diffraction angle to make the most suitable incident angle into diffraction grating 20a smaller.

The cycle of diffraction grating 20a preferably employs approximately a magnitude to generate the second diffractive light and the third diffractive light in view of optical coupling efficiency, and is approximately 0.5-5 times of a wavelength. In this case, the allowable range of an incident angle at a certain wavelength is very severe as small as ±0.1 degree in consideration of decrease of optical coupling efficiency.

On the other hand, in the case of utilizing semiconductor laser light of a Fabry Perot type as light radiated from light source 10, the wavelength of generated light is increased as the temperature rises. The suitable incident degree will vary by approximately 0.3 degree to exceed the above-described allowable range of an incident angle, when the utilizing temperature range is 0-60° C. and wavelength variation of semiconductor laser is generated as much as approximately ±10 nm.

When wavelength variation exceeds the incident angle allowable range, optical coupling efficiency will be decreased even when variation of the angle between diffraction grating 20a and light incident thereto due to mechanical variation is not generated. To improve this, it is necessary to vary an incident angle into diffraction grating 20a depending on wavelength variation, and to meat the situation, a diffraction grating is arranged on optical element 50 which will be explained below.

Figure 5:
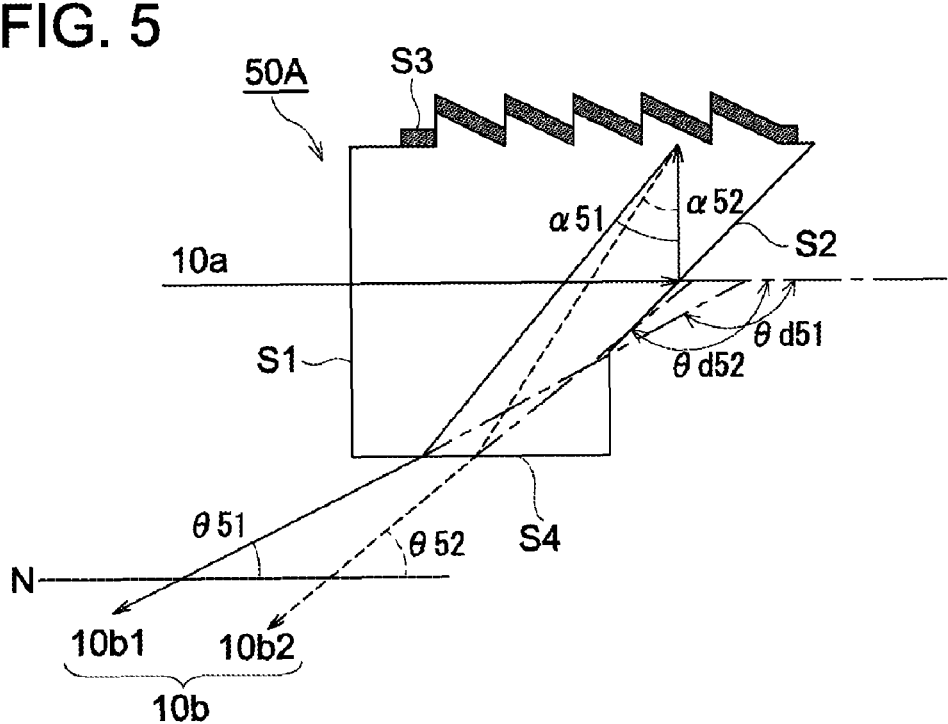
FIG. 5 is a cross-sectional view to show an example of an optical element together with an optical path.

Optical element 50 will now be explained. From optical elements from 50A to 50D and 50E, which deflect light 10a from light source 10, emit light 10b to be coupled with wave guide 20 and are fixed on suspension 4, and which will be described later, are generally referred to as optical element 50. In FIG. 2, optical element 50A shown in FIG. 5 is described as an example of optical element 50. Further, as specific examples of optical element 50, optical elements 50A-50D and 50D-4 are shown in FIGS. 5-9, and optical elements 50A-50D (including modified examples) and the circumference are shown in FIGS. 10-15 together with the light path as cross-sectional views. Herein, in FIGS. 10-15, magnetic recording part 40 and magnetic information reproducing part 41, which are equipped on slider 30, are omitted.

Optical element 50 can be formed by means of an ejection molding method or a press molding method utilizing such as thermoplastic resin as a material which transmits light. Thermoplastic resin includes such as ZEONEX (registered trade mark) 480R (refractive index: 1.525, Zeon Corp.), PMMA (polymethyl methacrylate, such as Sumipex (registered trade mark) MGSS, refractive index: 1.49, Sumitomo Chemical Co., Ltd.), and PC (polycarbonate, such as Panlite (registered trade mark) AD5503, refractive index: 1.585, Teijin Chemicals Ltd.). Optical element 50 can be also formed by means of a press molding method utilizing glass in stead of resin as a material.

Further, in the case of optical element 50D shown in FIG. 8 which is provided with a reflection type diffraction grating contacting with air and will be explained later, optical element 50 can be formed by metal. For example, a diffraction grating can be formed by a method well known in the art in which a latent image is formed on metal such as SUS by a procedure such as optical drawing (such as mask exposure, reduction projective exposure and interference exposure), electronic drawing and X ray drawing followed by development. Further, film to increase reflectance may be provided on the surface of a diffraction grating.

Optical element 50A shown in FIG. 5 will now be explained. Optical element 50A is a prism and light 10a incident from surface S1 is reflected by surface S2 to be incident approximately vertically on surface S3 where a reflection type diffraction grating is present. Surface S3 is a reflection type diffraction grating of a blazed form, which is provided with metallic reflection film of such as Al or Ag, and dielectrics multi-layer film for reflection. Surface S2 is an internal reflection surface and there is a case to utilize total reflection or a case to provide metallic reflection film such as Al, Ag, or Au and dielectrics multi-layer film similar to the above. Light being incident and diffracted on surface S3 is emitted from surface S4. When the wavelengths of light 10a incident on surface S1 are λ1 and λ2 satisfying equation (1), the diffraction angles α51 and α52 on surface S3 corresponding to λ1 and λ2 respectively are as follows:

$$\alpha 1 > \alpha 52 \tag{3}$$

Diffraction angle α is defined on the basis of the proceeding direction of 0-order diffraction light at the time of diffraction. 0-order diffraction light indicates light being reflected without being diffracted on a diffraction surface simply as a reflection surface when incident light is incident on a reflection type diffraction surface, and the proceeding direction of 0-order diffraction light is identical to the proceeding direction of light reflected by a diffraction surface simply as a reflection surface at a reflective angle same as an incident angle. Herein, in the case of a diffraction surface being a transparent type diffraction surface, 0-order diffraction light indicates light which transmits through a diffraction surface without being diffracted, and the proceeding direction of 0-order diffraction light is identical to the proceeding direction of light which is deflected due to the refractive index difference on the diffraction surface provided with a diffraction grating simply as a transmitting surface.

In the case of optical element 50A, since light reflected on surface S2 is approximately vertically incident on surface S3, 0-order diffraction light on surface S3 is approximately vertically reflected and passes a light path which is nearly same as the light incident on surface S3. Therefore, the above-described diffraction angles α51 and α52 are as shown in FIG. 5.

According to the relationship of equation (3), the incident angles to diffraction grating 20a of wave guide 20 are as follows; which are shown in FIG. 5:

$$\theta 51 > \theta 52 \tag{4}$$

The incident angle of light 10b1 having a wavelength λ1 is θ51, and the incident angle of light 10b2 having a wavelength λ2 is θ52.

As described above, when wavelength of light incident on diffraction grating with which surface S3 is provided varies, the angle of diffraction will vary depending on the wavelength to enable variation of the deflection angle of light emitted from optical element 50A. By utilizing a diffraction grating in this manner, angle variation of deflection angle of optical element 50A which depends on the wavelength can be adjusted with the suitable angle variation of incident angle of wave guide 20 which depends on the wavelength. That is, by adjusting at least one of the cycle of a reflection type diffraction grating which is arranged on surface S3, or the cycle of diffraction grating 20a, it is possible to adjust incident angle so as to make θ11=θ51 at wavelength λ1 and θ12=θ52 at wavelength λ2.

By this adjustment, light incident on optical element 50A equipped with a diffraction grating is efficiently introduced into wave guide 20 as if there is no wavelength variation of semiconductor laser light. With respect to the above-described adjustment, it is similar also in the case of optical elements from 50B to 50D which will be explained below.

Figure 10:
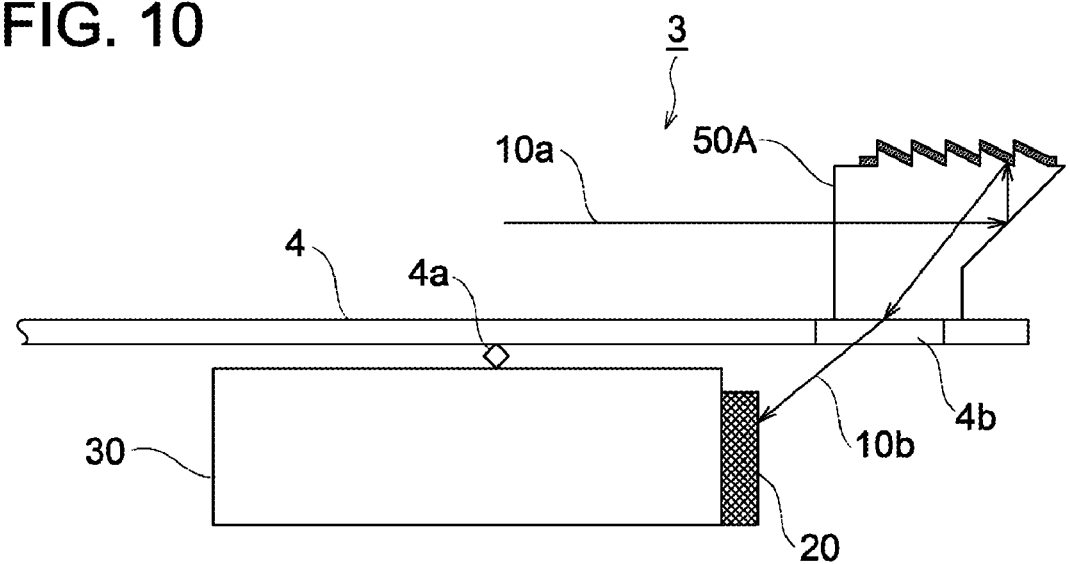
FIG. 10 is a cross-sectional view of a state to introduce light into a wave guide arranged on a slider by an optical element shown in FIG. 5.

A state in which an optical element 50A is fixed on suspension 4 and constitutes optical recording head in combination with slider 30 is shown in FIG. 10. Optical element 50A is fixed on the edge portion of the upper surface of suspension 4 with such as an adhesive. Light 10a from light source 10 proceeding toward the right direction in the drawing (refer to FIG. 2) is deflected by optical element 50A and emitted from optical element 50A to pass through the opening part 4*b* arranged in a suspension 4. light having passed through opening 4*b* proceeds so as to be incident into wave guide 20 of slider 30 arranged on the under surface of suspension 4.

Deflection angle θ*d* formed by the proceeding direction of light 10*a* incident into wave guide and the proceeding direction of light 10*b* emitted from optical element 50A is not less than 90 degrees as shown by degree θ*d*51 and θ*d*52 in FIG. 5. By utilizing optical element 50A which is capable of making deflection angle of incident light θ*d* of not smaller than 90 degrees, as shown in FIG. 10, it is possible to easily constitute optical recording head 3, which makes light incident into wave guide 20 arranged on the side surface of slider 30 from the opposite direction against the proceeding direction of incident light (light 10*a*) from a light source. The constitution such as described above is similarly possible in optical elements from 50B to 50D, which will be explained later.

Deflection angle θ*d* is easily adjusted to a suitable incident angle toward wave guide 20 which is arranged on the side surface of slider 30 also in consideration of deflection due to refraction, by deflection of the reflection surface of surface S2 and of reflection type diffraction grating of surface S3 which are equipped on optical element 50A. Further, by making a state in which proceeding direction of light 10*a* incident into optical element 50A is along suspension 4, it is possible to constitute thin optical recording head 3. These advantages are similarly possible in optical elements 50B to 50D which will be explained below.

On the light path to reach diffraction grating 20*a* of wave guide 20, a diffraction grating with which optical element 50 is equipped is preferably arranged as near as possible to diffraction grating 20*a*. When a diffraction grating with which optical element 50 is equipped is arranged near to diffraction grating 20*a*, the variation width of a light irradiation position due to variation of a diffraction angle generated by wave length variation is restrained to make the size of diffraction grating 20*a* small. Therefore, slider 30 which is arranged on the side surface of wave guide 20 can be made thinner to enable constitution of thinner optical recording head 3. In optical element 50A, surface S3 which finally deflects light so as to be directed to diffraction grating 20*a* is arranged near the light path against diffraction grating 20*a* as a reflection type diffraction grating surface.

Figure 6:
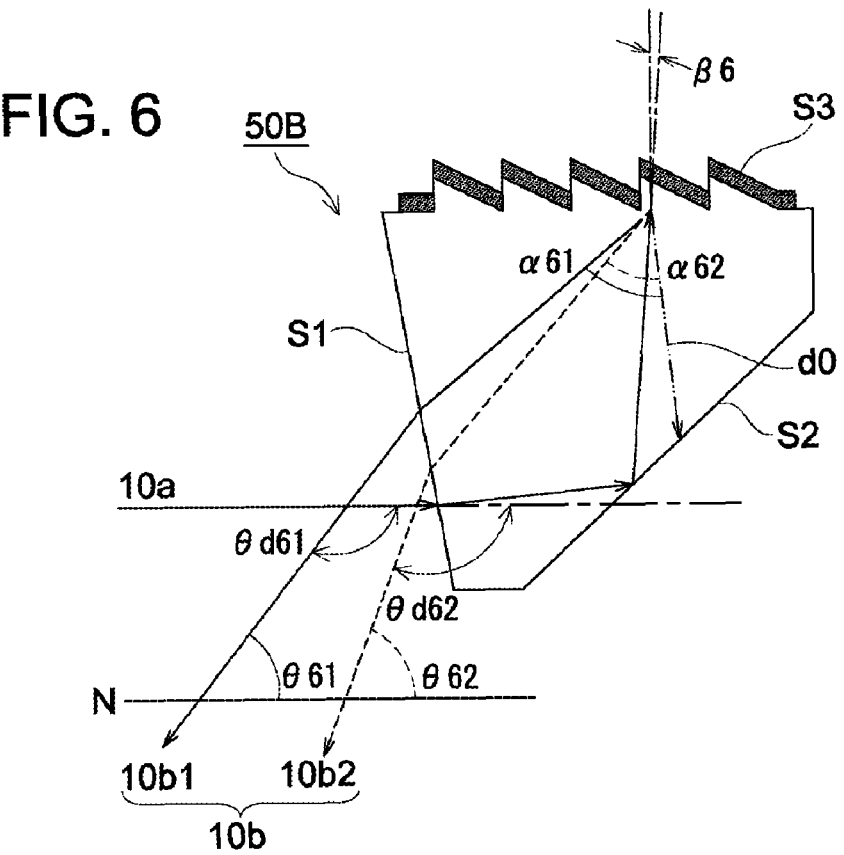
FIG. 6 is a cross-sectional view to show an example of an optical element together with an optical path.

Optical element 50B shown in FIG. 6 will now be explained. Optical element 50B is a prism and light 10*a* incident from surface S1 is reflected on surface S2 to be incident on surface S3 where a reflection type diffraction grating is present. Surface S3 is a reflection type diffraction grating of a blazed form which is provided with metallic reflection film and dielectrics multi-layer film. Surface S2 is an internal reflection surface, which may utilize total reflection or may be provided with metallic reflection film and dielectrics multi-layer film similarly to the above-described case. In FIG. 6, the incident angle on surface S3 is represented by β6 and 0-order diffraction light by d0. Light incident on surface S3 is diffracted to be emitted from surface S1. When the wavelengths of light 10*a* incident on surface S1 are λ1 and λ2 which satisfy equation (1), diffraction angles α61 and α62 at surface S3 corresponding to wavelengths λ1 and λ2 respectively are as follows:

$$\alpha 61 > \alpha 62 \qquad (5)$$

In the case of optical element 50B, since light reflected on surface S2 is incident on surface S3 at incident angle β6, 0-order diffraction light d0 on surface S3 is diffracted at reflection angle α6. The above described diffraction angles α61 and α62 on the basis of 0-order diffraction light d0 are as shown in FIG. 6.

The incident angles into diffraction grating 20*a* of wave guide 20 are as follows; which are shown in FIG. 6.

$$\theta 61 < \theta 62 \qquad (6)$$

The incident angle of light 10*b*1 having wavelength λ1 is θ61 and the incident angle of light 10*b*2 having wavelength λ2 is θ62.

Similar to optical element 50A, by adjusting at least one of the cycle of a reflection type diffraction grating equipped on surface S3 and the cycle of a diffraction grating 20*a*, the incident angle can be adjusted so as to make θ11=θ61 at wavelength λ1 and θ12=θ62 at wavelength λ2.

Figure 11:
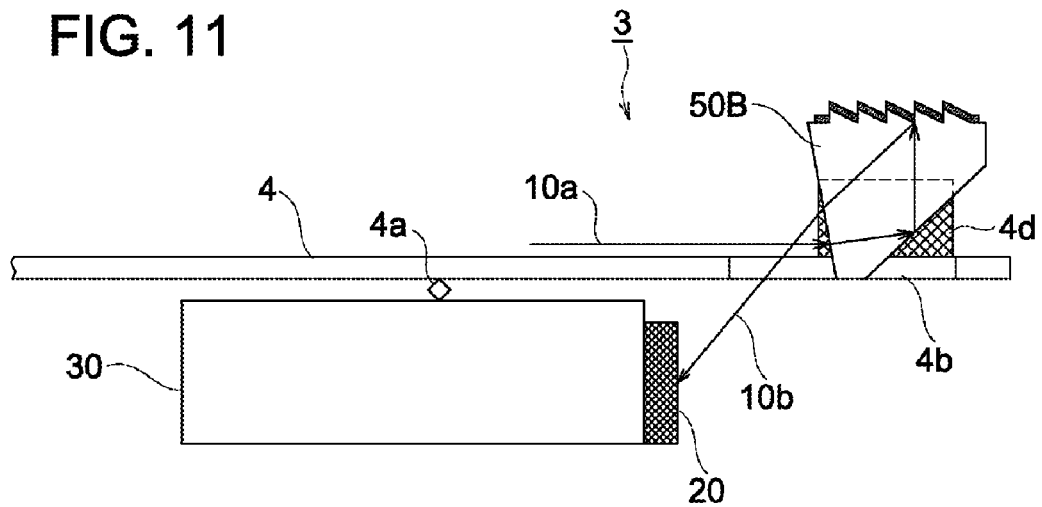
FIG. 11 is a cross-sectional view of a state to introduce light into a wave guide arranged on a slider by an optical element shown in FIG. 6.

A state in which optical element 50B is fixed on suspension 4 and constitutes optical recording head 3 in combination with slider 30 is shown in FIG. 11. Optical element 50B is fixed with such as an adhesive at the both sides thereof on fixing plate 4*d* which is arranged nearly vertically on the upper surface of the edge portion of suspension 4. Light 10*a* from light source 10 which proceeds to the right direction in the drawing (refer to FIG. 2) is deflected by optical element 50B and emitted from optical element 50B to pass through opening 4*b* arranged on suspension 4. Light 10*b* having passed through opening 4*b* proceeds so as to be incident into wave guide 20 on slider 30.

Deflection angle θ*d* of optical element 50B is not smaller than 90 degree as shown by angles θ*d*61 and θ*d*62 in FIG. 6. Further, similar to optical element 50A, surface S3 which finally deflects light to proceed toward diffraction grating 20*a* is arranged as a reflection type diffraction grating near to the optical path relative to diffraction grating 20*a*.

Figure 7:
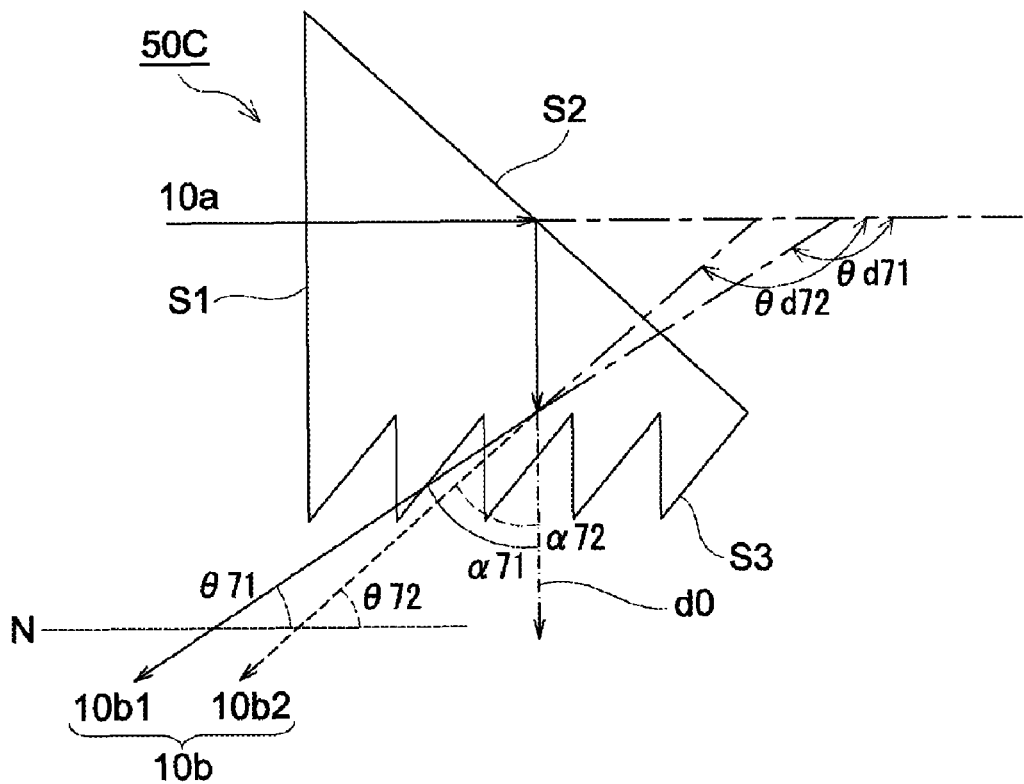
FIG. 7 is a cross-sectional view to show an example of an optical element together with an optical path.

Optical element 50C shown in FIG. 7 will now be explained. Optical element 50C is a prism and light 10*a* incident from surface S1 is reflected on surface S2 to be nearly vertically incident on surface S3 where a transparent type diffraction grating having a blazed form is present. Surface S2 is an internal reflection surface, which may utilize total reflection and may be provided with metallic reflection film and dielectrics multi-layer film similarly to the above-described case. In FIG. 7, 0-order diffraction light emitted from surface S3 is shown. Light incident on surface S3 is diffracted and emitted. When the wavelengths of light 10*a* incident on surface S1 are λ1 and λ2 which satisfy equation (1), diffraction angles α71 and α72 on surface S3 corresponding to wavelengths λ1 and λ2 respectively are as follows:

$$\alpha 71 > \alpha 72 \qquad (7)$$

In the case of optical element 50C, since light reflected on surface S2 is nearly vertically incident on surface S3, 0-order diffraction light on surface S3 transmits in nearly the vertical direction against surface S3. The above-described diffraction angles α71 and α72 on the basis of 0-order diffraction light d0 are as shown in FIG. 7.

From the relationship of equation (7), the incident angles into diffraction grating 20*a* of wave guide 20 are as follows, which are shown in FIG. 7.

$$\theta 71 < \theta 72 \qquad (8)$$

The incident angle of light 10*b*1 having wavelength λ1 is θ71 and the incident angle of light 10*b*2 having wavelength λ2 is θ72.

Similarly to optical element 50A, by adjusting at least one of the cycle of a reflection type diffraction grating equipped on surface S3 and the cycle of a diffraction grating 20*a*, the incident angle can be adjusted so as to make θ11=θ71 at wavelength λ1 and θ12=θ72 at wavelength λ2.

Figure 12A:
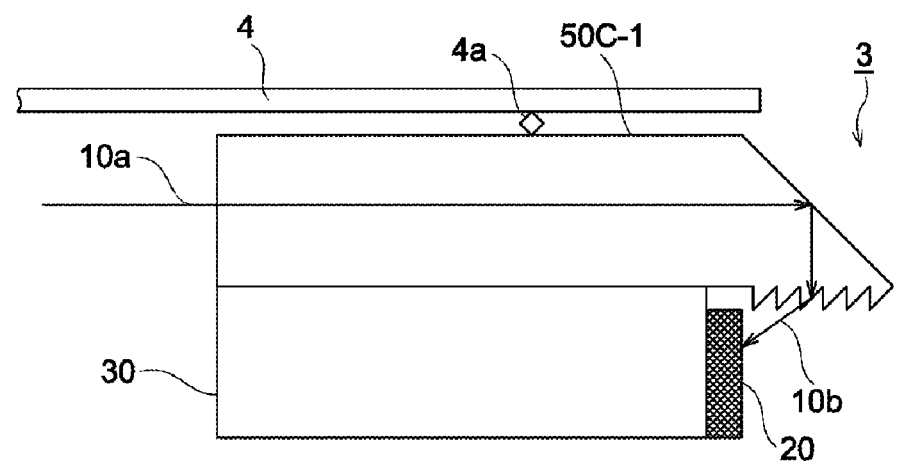
FIG. 12a is a cross-sectional view of a state to introduce light into a wave guide arranged on a slider by an optical element shown in FIG. 7.

A state in which optical element 50C is fixed on suspension 4 and constitutes optical recording head 3 in combination with slider 30 is shown in FIG. 12a. Optical element 50C-1 has a form to arrange the column portion on the light incident side of optical element 50C for the convenience of fixing and fixed on slider 30, whereby optical element 50C-1 is attached to suspension 4. Light 10a from light source 10 which proceeds to the right direction in the drawing (refer to FIG. 2) is deflected by optical element 50C-1 and emitted from optical element 50C-1 to proceed so as to be incident into wave guide 20 on slider 30. Herein, in the case of optical recording head 3 shown in FIG. 12a, light source 10 is arranged under arm 5 as shown in FIG. 17.

Deflection angle θd of optical element 50C is not smaller than 90 degree as shown by angles θd71 and θd72 in FIG. 7. A diffraction grating equipped on optical element 50C is a transparent type diffraction grating and surface S3 where this transparent type diffraction grating is present forms emission surface of optical element 50C. Therefore a diffraction grating equipped on optical element 50C is arranged nearest to diffraction grating 20a of wave guide 20 on the light path in optical element 50C.

Optical element 50D shown in FIG. 8 will now be explained. Optical element 50D is a mirror and a reflection type diffraction grating of a blazed form is present on surface S1 on which metallic reflective film and dielectrics multilayer film are provided. Light 10a incident on surface S1 is diffracted. In FIG. 8, the incident angle on surface S1 is represented by β8 and 0-order diffraction light by d0. When the wavelengths of light 10a incident on surface S1 are λ1 and λ2 which satisfy equation (1), diffraction angles α81 and α82 on surface S1 corresponding to wavelengths λ1 and λ2 respectively are as follows:

$$\alpha 81 > \alpha 82 \tag{9}$$

In the case of optical element 50D, light 10a is incident on surface S1 at incident angle β8 and 0-order diffraction light d0 is diffracted at reflection angle β8. The above-described diffraction angles α81 and α82 on the basis of 0-order diffraction light d0 are as shown in FIG. 8.

From the relationship of equation (9), the incident angles into diffraction grating 20a of wave guide 20 are as follows, which are shown in FIG. 7.

$$\theta 81 < \theta 82 \tag{10}$$

The incident angle of light 10b1 having wavelength λ1 is θ81 and the incident angle of light 10b2 having wavelength λ2 is θ82.

Similar to optical element 50A, by adjusting at least one of the cycle of a reflection type diffraction grating equipped on surface S1 and the cycle of a diffraction grating 20a, the incident angle can be adjusted so as to make θ11=θ81 at wavelength λ1 and θ12=θ82 at wavelength λ2.

Figure 13:
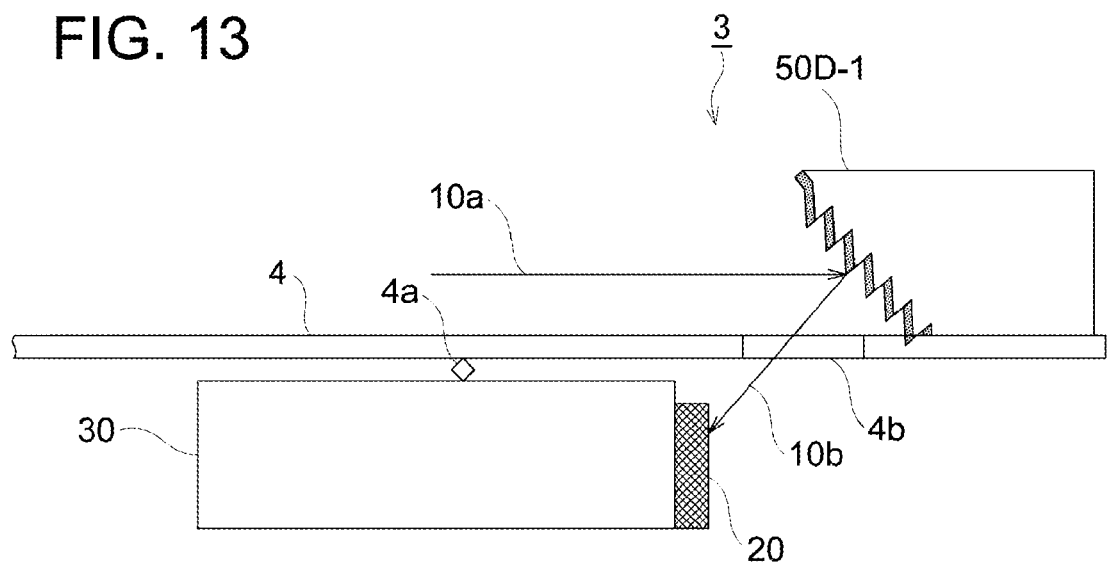
FIG. 13 is a cross-sectional view of a state to introduce light into a wave guide arranged on a slider by an optical element shown in FIG. 8.
Figure 14:
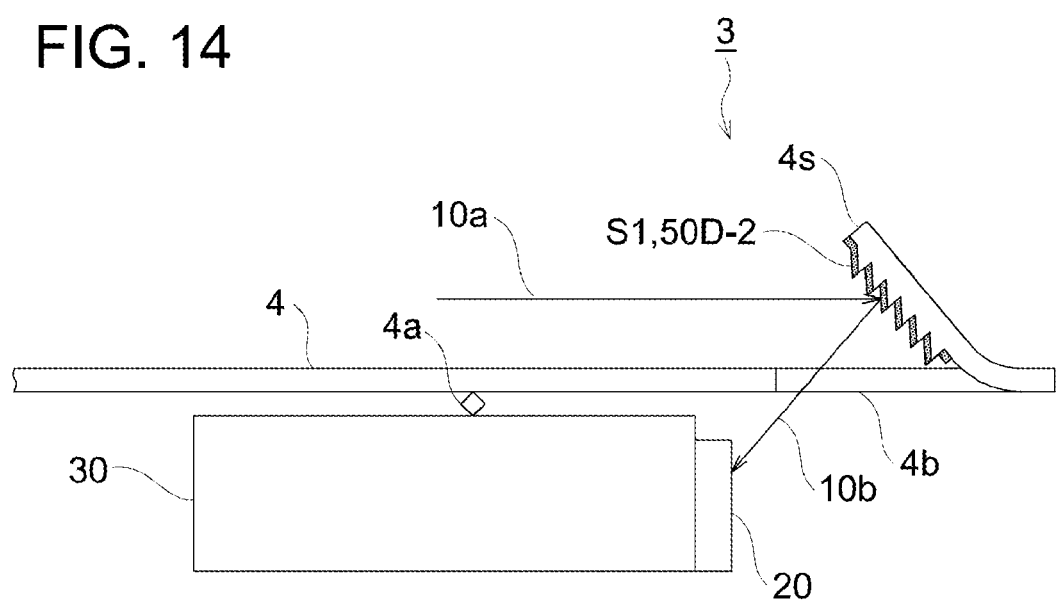
FIG. 14 is a cross-sectional view of a state to introduce light into a wave guide arranged on a slider by an optical element shown in FIG. 8.
Figure 15:
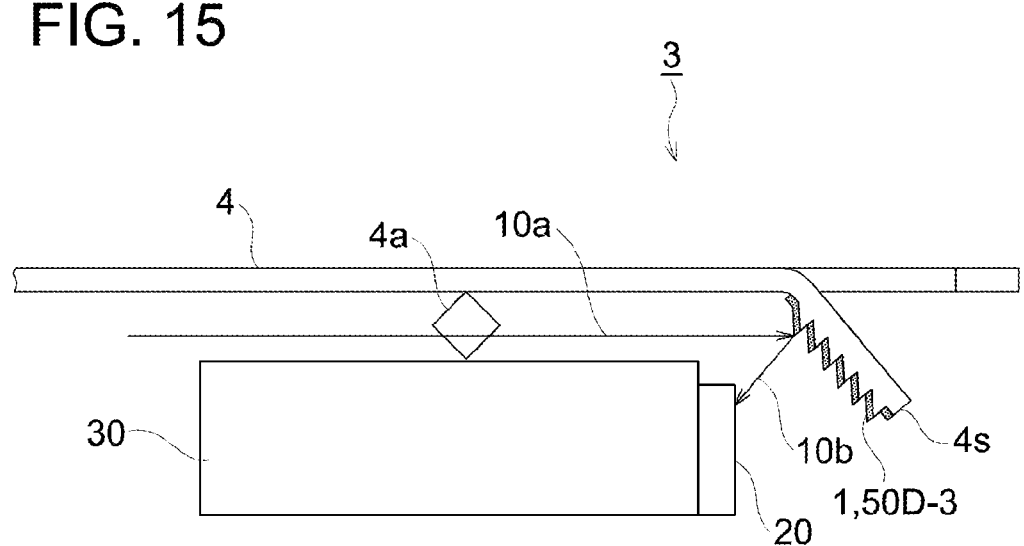
FIG. 15 is a cross-sectional view of a state to introduce light into a wave guide arranged on a slider by an optical element shown in FIG. 8.

A state in which optical element 50D is fixed on suspension 4 and constitutes optical recording head 3 in combination with slider 30 is shown in FIGS. 13-15.

In FIG. 13, optical element 50D-1 is made to be a form provided with a column part on the opposite side of surface S1 of optical element 50D for convenience of fixing and is fixed on the edge portion of the upper surface of suspension 4 with such as an adhesive. Light 10b deflected by optical element 50D-1 passes through the opening 4b arranged in a suspension 4. Light 10b having passed through opening 4b proceeds so as to be incident into wave guide 20 of slider 30 arranged on the under surface of suspension 4.

FIGS. 14 and 15 shows a state in which optical elements 50D-2 and 50D-3 are arranged on inclined surface portion 4s which has been provided by being bent and pulled up along the cut provided on suspension 4 in advance. Optical elements 50D-2 and 50D-3 may be those in which a reflection type diffraction grating is provided on a substrate such as glass and metal which is pasted up on inclined surface 4s of a plate form with such as an adhesive, or may be those in which a reflection type diffraction grating is directly formed on inclined surface portion 4s of suspension 4, as a preferable embodiment. Optical elements 50D-2 and 50D-3 of FIGS. 14 and 15 show the latter example.

By being made into one body with suspension 4 such as optical elements 50D-2 and 50D-3 shown in FIGS. 14 and 15, the number of parts to constitute optical recording head 3 can be decreased to make position adjustment and fixing with such as an adhesive at the time of assembly unnecessary. Thereby, it is possible to efficiently perform manufacturing of optical recording head 3 and to prepare optical recording head 3 having a high reliability.

The deflection angle of optical element 50D is not smaller than 90 degree as shown by angle θd81 and θd82 in FIG. 6. Further, optical element 50D can be arranged near to diffraction grating 20a of wave guide 20 as shown in FIGS. 13-15.

Figure 8:
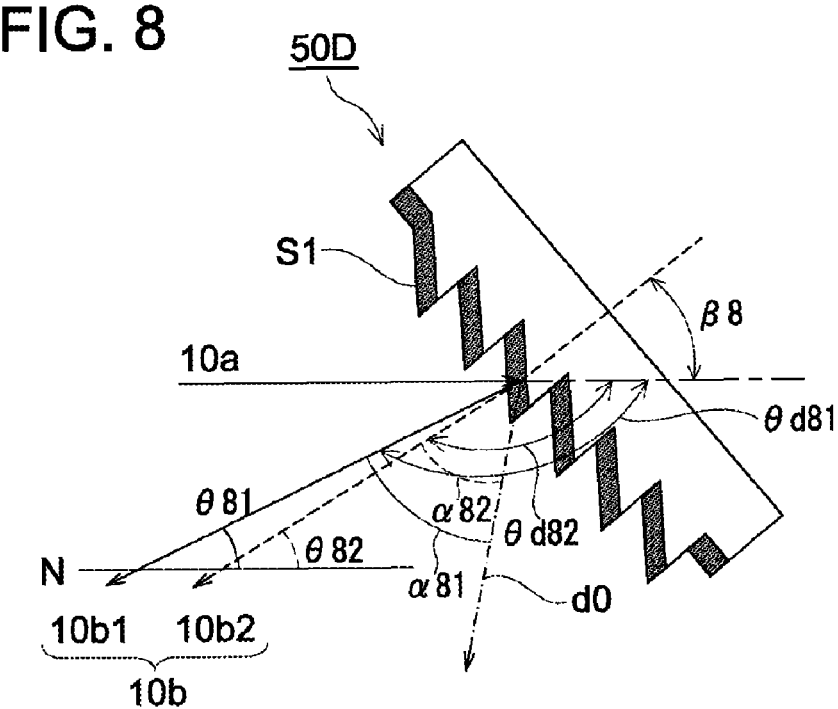
FIG. 8 is a cross-sectional view to show an example of an optical element together with an optical path.

In FIG. 8, surface S1 where a reflection type diffraction grating is present is in contact with air. Therefore, different from optical elements 50A-50C and 50D-4 shown in FIGS. 5-7 having been explained so far and in FIG. 9 described later, there causes no Fresnel's loss because the refractive index of a medium through which light 10a and light 10b pass does not vary.

When the case of surface S1 of optical element 50D being provided with metallic film and the case of such as surface S2 of optical element 50A being provided with metallic film are compared, the surface S1 can make the reflectance higher. This is because of refractive index difference between air on surface S1 and such as resin or glass on surface S2, as a medium with which a metallic reflection surface is in contact and through which light passes, and the reflectivity can be made higher when the smaller is refractive index of a medium contacting with metal.

Optical element 50D has only one optical surface which requires high precision and can be easily manufactured. Further, since the freedom of a form other than surface S1 is high, it is flexibly applicable to a form which can be easily attached to suspension 30 or slider 4.

Figure 9:
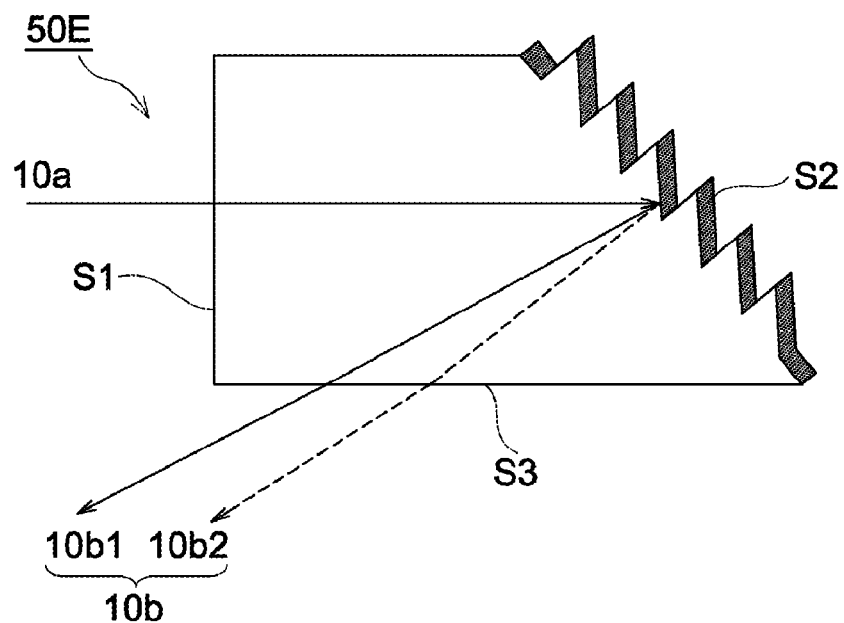
FIG. 9 is a cross-sectional view to show an example of an optical element together with an optical path.
Figure 12B:
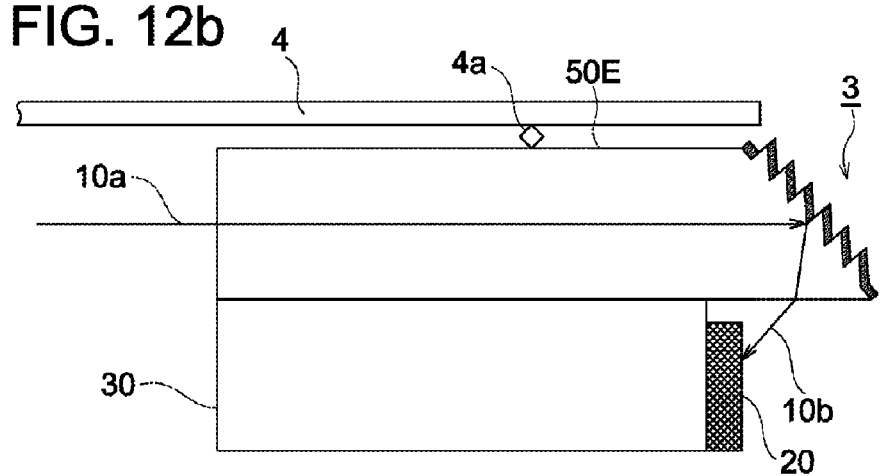
FIG. 12b is a cross-sectional view of a state to introduce light into a wave guide arranged on a slider by an optical element shown in FIG. 9.

A modified example of optical element 50D is shown as optical element 50E in FIG. 9. Optical element 50E is a prism and deflection of light 10a is conducted only at a reflection type diffraction grating on surface S2 similar to optical element 50D shown in FIG. 8. Since surface S2 is an internal reflection surface, a reflection type diffraction grating is not brought in contact with air. As shown in FIG. 12b, similar the way that optical element 50C-1 is fixed in FIG. 12a, optical element 50E is fixed on slider. It is similar to optical element 50A with respect to fixing of optical element 50E on suspension 4 to make an optical recording head in combination with slider 30. Since it is similar to optical element 50 D except these points, the explanation will be omitted.

The embodiments explained so far are related to an optically assisted magnetic recording head and an optically assisted magnetic recording system, however, the primary constitution of said embodiments can be also utilized for an optical recording head and an optical recording system employing an optical recording disc as a recording medium.

In this case, magnetic recording part 40 and magnetic information reproducing part 41 which are arranged on slide 30 are unnecessary.

According to an optical element of the above-explained embodiments of this invention, light accompanied with wavelength variation can be efficiently introduced into a wave guide, which is arranged so as to introduce light proceeding toward the opposite direction against the proceeding direction of incident light, by a single optical element.

What is claimed is:

1. An optical recording head comprising:
   a light source;
   a slider comprising a wave guide which irradiates light from the light source to a recording medium, wherein a grating coupler is formed on an end portion at an opposite side of the slider relative to the light source; and
   an optical element which comprises a diffraction grating and introduces the light from the light source to the grating coupler through the diffraction grating,
   wherein the optical element deflects the light from the light source back toward the light source with a deflection angle larger than 90 degrees.

2. The optical recording head of claim 1, wherein the diffraction grating of the optical element is a reflection type diffraction grating contacting with air.

3. The optical recording head of claim 1, wherein the optical element is formed of a material which transmits light and the diffraction grating is a reflection type diffraction grating contacting with the material.

4. The optical recording head of claim 1, wherein the optical element is formed of a material which transmits light and comprises a reflection surface deflecting the light incident from the light source, and the diffraction grating is a transmission type diffraction grating arranged on a light exiting surface through which the light exits from the optical element.

5. The optical recording head of claim 1, wherein the optical element is formed of a material which transmits light and comprises a reflection surface which deflects the light incident from the light source, and the diffraction grating is a reflection type diffraction grating contacting with the material which transmits light.

6. The optical recording head of claim 2, further comprising a suspension which supports the slider, wherein the optical element is formed on an inclined surface portion provided on an end of the suspension.

7. The optical recording head of claim 6, wherein the inclined surface portion is formed by being bent and pulled up along a cut provided on a part of the suspension and the optical element is formed directly on the inclined surface.

8. An optical recording apparatus comprising the optical head of claim 1 and the recording medium.

9. The optical recording head of claim 1, further comprising a suspension having a first side and a second side, the first side of the suspension facing the recording medium and being opposite to the second side of the suspension, and wherein the slider is mounted on the first side of the suspension.

10. The optical recording head of claim 9, wherein the optical element is mounted on the second side of the suspension, the suspension has an opening there through from the first side to the second side, and the optical element deflects the light from the light source through the opening in the suspension.

11. The optical recording head of claim 1, wherein the optical element is mounted to the slider.

12. The optical recording head of claim 11, wherein the diffraction grating of the optical element is a reflection type diffraction grating contacting with air.

13. The optical recording head of claim 11, wherein the optical element is formed of a material which transmits light and the diffraction grating is a reflection type diffraction grating contacting with the material.

14. The optical recording head of claim 11, wherein the optical element is formed of a material which transmits light and comprises a reflection surface deflecting the light incident from the light source, and the diffraction grating is a transmission type diffraction grating arranged on a light exiting surface through which the light exits from the optical element.

15. The optical recording head of claim 11, wherein the optical element is formed of a material which transmits light and comprises a reflection surface which deflects the light incident from the light source, and the diffraction grating is a reflection type diffraction grating contacting with the material which transmits light.

16. The optical recording head of claim 11, wherein the suspension has a first side and a second side, the first side of the suspension facing the recording medium and being opposite to the second side of the suspension, and wherein the slider and optical element are on the first side of the suspension.

17. The optical recording head of claim 11, wherein the optical element is mounted to a side of the slider opposite to a side of the slider facing the recording medium.

18. An optical recording apparatus comprising the optical head of claim 11 and the recording medium.

* * * * *